United States Patent
Takezawa (10) Patent No.: US 10,752,079 B2
(45) Date of Patent: Aug. 25, 2020

(54) VEHICLE

(71) Applicant: HONDA MOTOR CO., LTD., Tokyo (JP)

(72) Inventor: Tetsuya Takezawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 712 days.

(21) Appl. No.: 15/520,945

(22) PCT Filed: Jun. 9, 2015

(86) PCT No.: PCT/JP2015/066566
§ 371 (c)(1),
(2) Date: Apr. 21, 2017

(87) PCT Pub. No.: WO2016/063567
PCT Pub. Date: Apr. 28, 2016

(65) Prior Publication Data
US 2017/0341482 A1   Nov. 30, 2017

(30) Foreign Application Priority Data
Oct. 22, 2014   (JP) .................. 2014-215526

(51) Int. Cl.
*B60H 1/00*   (2006.01)
*B60K 1/04*   (2019.01)
(Continued)

(52) U.S. Cl.
CPC ..... *B60H 1/00278* (2013.01); *B60H 1/00028* (2013.01); *B60H 1/00207* (2013.01);
(Continued)

(58) Field of Classification Search
CPC ............ B60H 1/00278; B60H 1/00028; B60H 1/00207; B60H 1/00385; B60H 1/00564;
(Continued)

(56) References Cited

U.S. PATENT DOCUMENTS 5,490,572 A * 2/1996 Tajiri ................. B60H 1/00278
180/65.1
2009/0257190 A1   10/2009 Yoda
(Continued)

FOREIGN PATENT DOCUMENTS

CN   101287618 A   10/2008
CN   101535074 A   9/2009
(Continued)

OTHER PUBLICATIONS

Office Action dated Sep. 21, 2018, issued in counterpart Chinese Application No. 201580056720.2. (5 pages).
(Continued)

*Primary Examiner* — Grant Moubry
*Assistant Examiner* — Ryan L Faulkner
(74) *Attorney, Agent, or Firm* — Westerman, Hattori, Daniels & Adrian, LLP (57) ABSTRACT

A discharged air flow path connected to a cooling fan has a first discharged air flow path which is connected to at least one side trim of a left side trim and a right side trim and a second discharged air flow path which branches off from the first discharged air flow path and which is connected to the side trim. A first connecting portion which connects the first discharged air flow path and the side trim is disposed so as to be spaced away from a second connecting portion which connects the second discharged air flow path and the side trim in a front-rear direction. The first discharged air flow path and the second discharged air flow path discharge air into a passenger compartment by way of the side trim.

10 Claims, 7 Drawing Sheets

(51) Int. Cl.
*H01M 10/625* (2014.01)
*H01M 10/613* (2014.01)
*B60K 11/06* (2006.01)
*B62D 25/20* (2006.01)
*H01M 10/6563* (2014.01)
*B60K 1/00* (2006.01)

(52) U.S. Cl.
CPC ..... *B60H 1/00385* (2013.01); *B60H 1/00564* (2013.01); *B60K 1/04* (2013.01); *B60K 11/06* (2013.01); *H01M 10/613* (2015.04); *H01M 10/625* (2015.04); *B60H 2001/003* (2013.01); *B60H 2001/00228* (2013.01); *B60K 2001/005* (2013.01); *B60K 2001/0427* (2013.01); *B62D 25/20* (2013.01); *H01M 10/6563* (2015.04)

(58) Field of Classification Search
CPC .... B60H 2001/00228; B60H 2001/003; B60H 2001/00221; B60H 1/246; B60H 1/00557; H01M 10/613; H01M 10/625; H01M 10/6563; B60K 1/04; B60K 11/06; B60K 2001/005; B60K 2001/0427; B62D 25/20
USPC ........................................................ 454/143
See application file for complete search history.

(56) References Cited

U.S. PATENT DOCUMENTS

| | | |
|---|---|---|
| 2010/0071980 A1 | 3/2010 | Kokaji et al. |
| 2010/0089675 A1 | 4/2010 | Nagata et al. |
| 2010/0231035 A1* | 9/2010 | Tsuchiya ............ B60H 1/00278 307/9.1 |
| 2013/0140101 A1* | 6/2013 | Lim ........................ B60K 1/04 180/68.5 |

FOREIGN PATENT DOCUMENTS

| | | |
|---|---|---|
| JP | 2007-223523 A | 9/2007 |
| JP | 2007-299592 A | 11/2007 |
| JP | 2008-149818 A | 7/2008 |
| JP | 2009-255774 A | 11/2009 |
| JP | 2013-116724 A | 6/2013 |

OTHER PUBLICATIONS

International Search Report dated Jul. 14, 2015, issued in counterpart International Application No. PCT/JP2015/066566 (1 page).

\* cited by examiner

VEHICLE

TECHNICAL FIELD

The present invention relates to a vehicle and more particularly to a vehicle which includes a discharged air flow path through which cooling air used to cool a high-voltage battery or the like is discharged.

BACKGROUND ART

In a hybrid electric vehicle or an electric vehicle, a battery is mounted as a drive source for an electric motor. A battery generates heat when the battery charges or discharges, and the efficiency of the battery is reduced when the battery is heated to a high temperature. Owing to this, various cooling constructions have been proposed to introduce cooling air to cool the battery (refer to Patent Literatures 1, 2, and 3, for example). On the other hand, in recent years, it has been studied that a battery and a cooling fan are integrated into a unit to be disposed within a passenger compartment, so that cooling air that has been used to cool the battery is discharged into the passenger compartment.

Patent Literature 1 discloses a power supply unit which includes a long air discharge duct which is formed to extend towards a circumferential edge portion of a passenger compartment to discharge part of air used to cool a DC-DC converter towards the circumferential edge portion, and a short air discharge duct which is formed to have a discharge line which is shorter than that of the long discharge duct and which is configured to discharge part of the cooling air used to cool the DC-DC converter into the passenger compartment. The power supply unit is configured to cool the DC-DC converter using cooling air used to cool a battery.

Patent Literature 2 discloses an onboard battery cooling construction which eliminates a forced layout of pipe connecting a battery pack with a cooling fan and minimizes resistance in a flow path by disposing the battery pack in a mounting space defined near front seats and disposing the cooling fan in a mounting space defined near rear seats. The onboard battery cooling construction thus enables an efficient discharge of cooling air.

Patent Literature 3 discloses a battery pack mounting construction which branches a discharge passageway into passageways which extend along both sides of a center console from a rear lower side of the battery pack and which communicate with a center floor reinforcement frame placed transversely of a vehicle body on a floor panel of a vehicle. The battery pack mounting construction discharges the cooling air to an exterior portion of the vehicle body via the center floor reinforcement frame and thus suppresses uncomfortableness given to occupants by cooling air used to cool batteries in a battery pack by providing the discharge passageway.

PRIOR ART LITERATURE

Patent Literature

Patent Literature 1: JP-A-2007-223523
Patent Literature 2: JP-A-2008-149818
Patent Literature 3: JP-A-2013-116724

SUMMARY OF THE INVENTION

Problem that the Invention is to Solve

In the constructions described in Patent Literatures 1, 2, however, there still has been room for improvement in suppressing the influence given to the occupants by the cooling air. Patent Literature 3 relates to the construction for discharging the cooling air to the exterior of the vehicle body and maintains nothing about a construction for discharging cooling air into a passenger compartment without giving uncomfortableness to occupants.

The invention is to provide a vehicle which can discharge cooling air used to cool a battery into a passenger compartment in a spreading fashion without giving uncomfortableness to occupants.

Means for Solving the Problem

The invention provides the following aspects.

With a view to achieving the object described above, according to a first aspect of the invention, there is provided a vehicle (e.g., a vehicle 10 in embodiment which will be described later) including:

a pair of a left side sill (e.g., a left side sill 13L in embodiment) and a right side sill (e.g., a right side sill 13R in embodiment) which extend in a front-rear direction;

a center console (e.g., a center console 30 in embodiment) which is disposed on a floor panel (e.g., a floor panel 11 in embodiment) and which installs therein a high-voltage battery (e.g., high-voltage batteries 32 in embodiment) and a cooling fan (e.g., a cooling fan 36 in embodiment);

a discharged air flow path (e.g., a discharged air flow path 80F in embodiment) which is connected to the cooling fan; and a left side trim (e.g., a left side trim 15L in embodiment) which covers the left side sill and a right side trim (e.g., a right side trim 15R in embodiment) which covers the right side sill, wherein the discharged air flow path has:

a first discharged air flow path (e.g., a first discharged air flow path 81F in embodiment) which is connected to the cooling fan and which is connected to a side trim, the side trim being at least one of the left side trim and the right side trim; and a second discharged air flow path (e.g., a second discharged air flow path 82F in embodiment) which branches off from the first discharged air flow path and which is connected to the side trim, wherein a first connecting portion (e.g., a first left connecting portion 84L, a first right connecting portion 84R in embodiment) which connects the first discharged air flow path and the side trim is spaced away from a second connecting portion (e.g., a second left connecting portion 85L, a second right connecting portion 85R in embodiment) which connects the second discharged air flow path and the side trim in the front-rear direction, and wherein the first discharged air flow path and the second discharged air flow path discharge air into a passenger compartment (e.g., a passenger compartment 87 in embodiment) via the side trim.

In a second aspect, in addition to the configuration according to the first aspect, the center console is disposed on a center tunnel (e.g., a center tunnel 12 in embodiment) which is formed on the floor panel so as to extend in the front-rear direction, a left cross member (e.g., a left cross member 16L in embodiment) which is connected to the left side sill and a right cross member (e.g., a right cross member 16R) which is connected to the right side sill are connected to the center tunnel, and the second discharged air flow path is made up of at least one cross member of the left cross member and the right cross member.

In a third aspect, in addition to the configuration according to the second aspect, one of a pair of left and right front seats (e.g., a left front seat 14L, a right front seat 14R in embodiment) is disposed on an upper surface of the cross member, and the second discharged air flow path branches off from the first discharged air flow path by connecting the first discharged air flow path to the cross member below the upper surface of the cross member.

In a fourth aspect, in addition to the configuration according to any one of the first to third aspects, a first discharge port (e.g., a first left discharge port 21L, a first right discharge port 21R in embodiment) is provided in the side trim between the first connecting portion and the second connecting portion in the front-rear direction.

In a fifth aspect, in addition to the configuration according to the fourth aspect, a rib (e.g., a rib 86 in embodiment) configured to disrupt a forward flow of discharged air is formed on the side trim in a position lying further forwards than the second connecting portion.

In a sixth aspect, in addition to the configuration according to the fourth or fifth aspect, a side lining (e.g., a left side lining 24L, a right side lining 24R in embodiment) is connected to a rear of the side trim, and a second discharge port (e.g., a second left discharge port 22L, a second right discharge port 22R in embodiment) is provided in the side lining In a seventh aspect, in addition to the configuration according to the sixth aspect, an opening portion (e.g., an opening portion 88 in embodiment) for a seat-belt anchorage is provided in the side trim, and a guide (e.g., a guide 89 in embodiment) configured to disrupt a flow of discharged air to the opening portion is provided in the side trim in a position lying upstream of the opening portion.

In an eighth aspect, in addition to the configuration according to any one of the first to seventh aspects, an air-conditioning heater duct (e.g., a left air-conditioning heater duct 91L, a right air-conditioning heater duct 91R in embodiment) is provided so as to extend along the first discharged air flow path.

In a ninth aspect, in addition to the configuration according to any one of the first to eighth aspects, the first discharged air flow path has:

a first left discharged air flow path (e.g., a first left discharge duct 81L in embodiment) which is connected to the left side trim; and a first right discharged air flow path (e.g., a first right discharge duct 81R in embodiment) which is connected to the right side trim, the second discharged air flow path has:

a second left discharged air flow path (e.g., a second left discharged air flow path 82FL in embodiment) which branches off from the first left discharged air flow path and which is connected to the left side trim; and a second right discharged air flow path (e.g., a second right discharged air flow path 82FR in embodiment) which branches off from the first right discharged air flow path and which is connected to the right side trim, the first left discharged air flow path and the second left discharged air flow path discharge air into the passenger compartment via the left side trim, and the first right discharged air flow path and the second right discharged air flow path discharge air into the passenger compartment via the right side trim.

In a tenth aspect, in addition to the configuration according to the ninth aspect, the first left discharged air flow path and the first right discharged air flow path are divided by a branch member (e.g., a branch duct 83 in embodiment) which is connected to the cooling fan.

Advantage of the Invention

According to the first aspect, the cooling air used to cool the high-voltage battery can be discharged into the side trim in a spreading fashion. Additionally, the air discharged into the side trim in a spreading fashion can be further discharged into the passenger compartment in a spreading fashion by way of the side trim, thereby making it possible to ensure a comfortable environment within the passenger compartment by suppressing the uncomfortableness given to the occupants by the cooling air.

According to the second aspect, part of the discharge duct which makes up the discharged air flow path is made unnecessary, whereby the number of parts involved can be reduced to thereby suppress the costs.

According to the third aspect, the cross member supports the front seat via a seat rail, and the cross member makes up the discharged air flow path, whereby the parts can be made commonable, which makes it possible to reduce the number of parts involved, thereby making it possible to suppress the costs.

According to the fourth aspect, the cooling air used to cool the high-voltage battery is discharged to the feet of the occupant, whereby the direct contact of the cooling air with the occupant can be prevented. Thus, it is possible to suppress the uncomfortableness given to the occupant by the cooling air, thereby making it possible to ensure the comfortable environment within the passenger compartment.

According to the fifth aspect, the discharged air is prevented from flowing to the front of the vehicle within the side trim to thereby allow the discharged air to be discharged to behind the front seat, thereby making it possible to eliminate uncomfortableness that would be given to the driver by the discharged air which flows around to the front seat.

According to the sixth aspect, the cooling air can be discharged from the first discharge port and the second discharge port in a spreading fashion, thereby making it possible to eliminate uncomfortableness that would be given to the occupant.

According to the seventh aspect, the flow of discharged air within the side trim can be rectified by the guide to restrict the discharged air from leaking from the opening portion, thereby making it possible to eliminate uncomfortableness that would be given to the occupant by the discharged air.

According to the eighth aspect, the temperature of the discharged air in the first discharged air flow path can be raised by a flow of air flowing through the air-conditioning heater duct, whereby a difference in temperature between the discharged air discharged into the passenger compartment and inside air within the passenger compartment is lessen. Thus it is possible to eliminate uncomfortableness that would be given to the occupant.

According to the ninth aspect, it is possible to discharge and spread the cooling air used to cool the high-voltage battery into the passenger compartment by way of the left side trim and the right side trim, thereby making it possible to eliminate uncomfortableness that would be given to the occupant by the cooling air.

According to the tenth aspect, the cooling air can be discharged in a spreading fashion into the first left discharged air flow path and the first right discharged air flow path simultaneously, thereby making it possible to reduce the number of parts involved.

MODE FOR CARRYING OUT THE INVENTION

Hereinafter, one embodiment of the invention will be described by reference to the drawings. The drawings should be seen in a direction in which given reference numerals look properly. In the following description, front, rear, left, right, up and down denote accordingly directions as seen from a driver of a vehicle. The front, rear, left, right, up and down of the vehicle are denoted by Fr, Rr, L, R, U and D, respectively.

Figure 1:
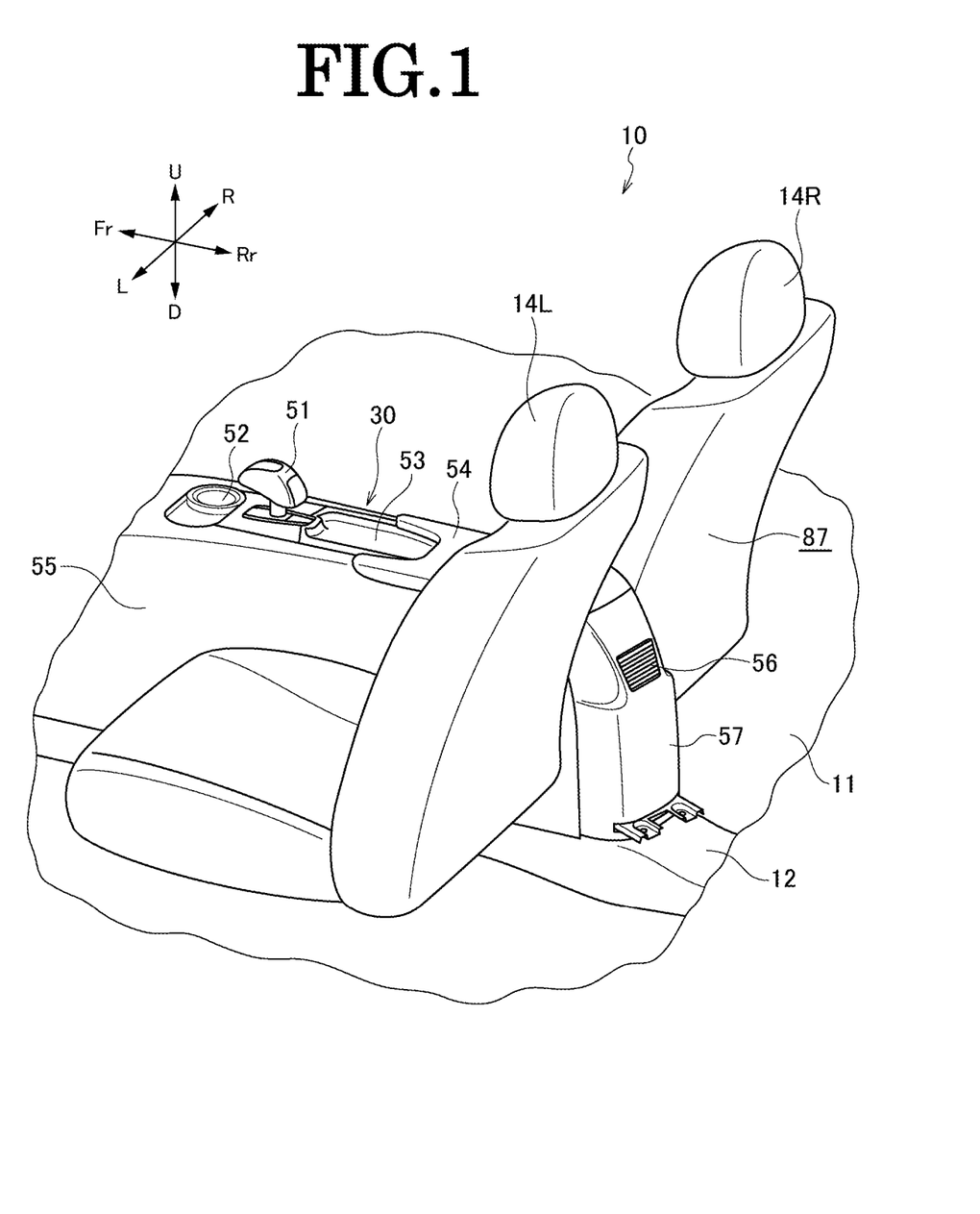
FIG. 1 is a perspective view showing front seats and a center console which is disposed between the front seats of a vehicle according to an embodiment of the invention.
Figure 2:
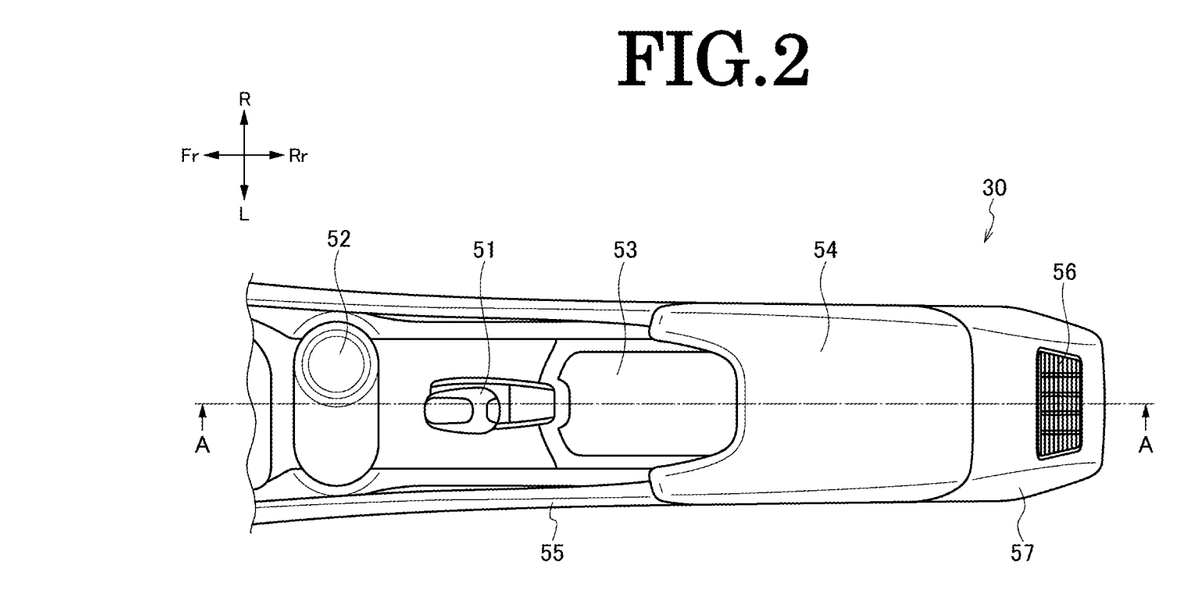
FIG. 2 is a plan view of the center console.
Figure 3:
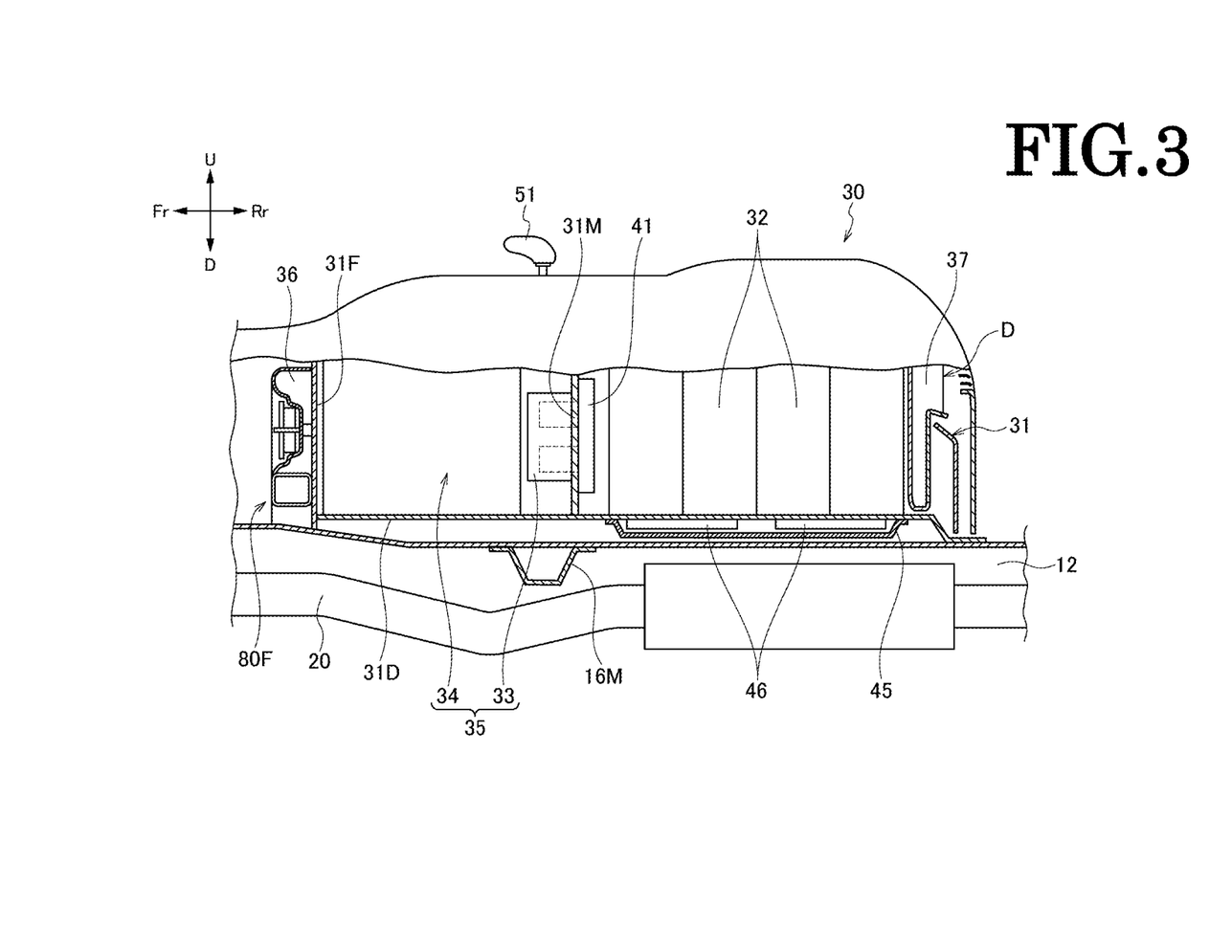
FIG. 3 is a partial sectional view taken along a line A-A in FIG. 2.

FIG. 1 is a perspective view showing front seats and a center console which is disposed between the front seats of a vehicle according to an embodiment of the invention, FIG. 2 is a plan view of the center console, and FIG. 3 is a partial sectional view of the center console.

As shown in FIGS. 1 to 3, in a vehicle 10 of this embodiment, a center console 30 is disposed over a center tunnel 12 formed on a floor panel 11, and an electric device D is accommodated in the center console 30.

<Center Console>

The center console 30 is disposed between a left front seat 14L and a right front seat 14R, and an interior space thereof is covered by an external cover 55 on an upper surface of which a cup holder 52, a shift knob 51, a small article accommodating tray 53 and an armrest 54 for front seat passengers are provided sequentially in that order from the front. A cover member 57 in which an intake grille 56 is provided is attached to a rear end of the external cover 55. The intake grille 56 takes in air inside a passenger compartment 87 as cooling air for the electric device D when a cooling fan 36, which will be described later, is activated.

<Electric Device>

Figure 4:
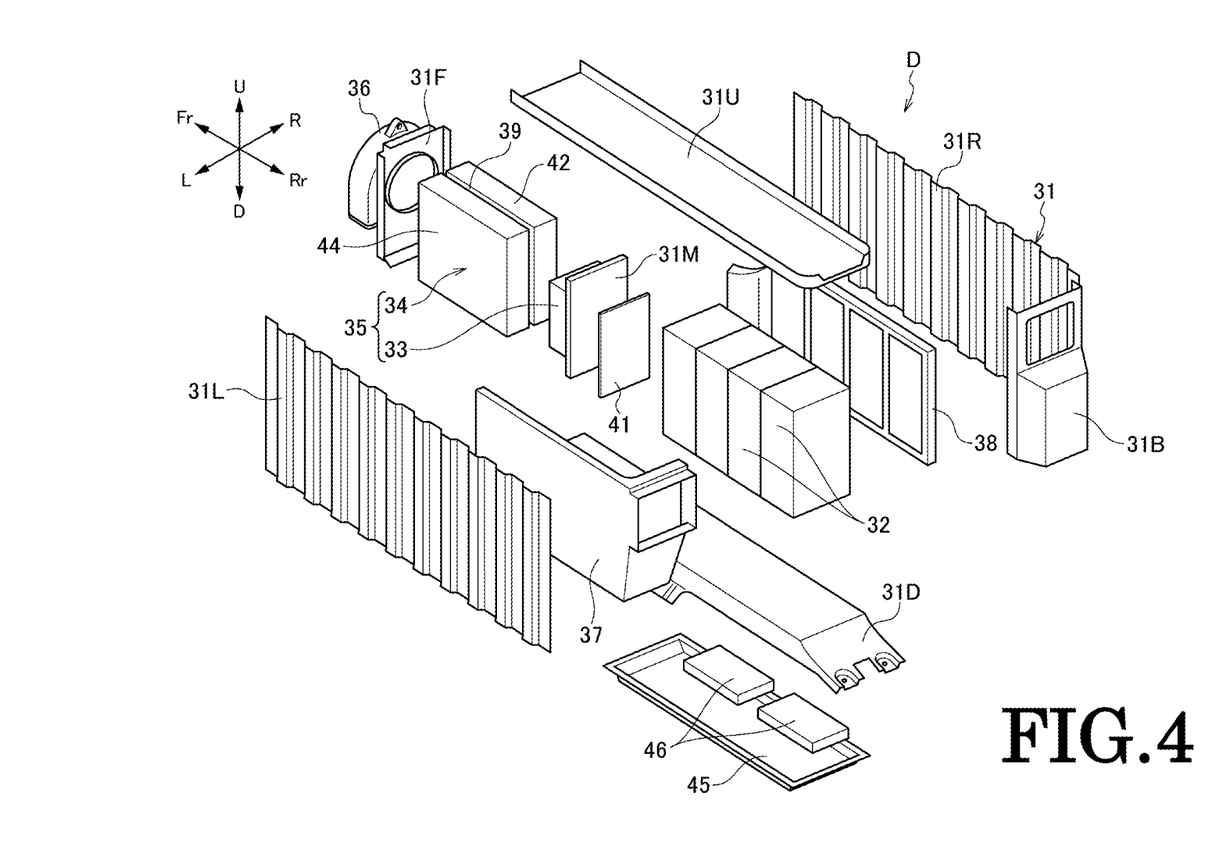
FIG. 4 is an exploded perspective view of an electric device accommodated in the center console.

Next, the electric device D accommodated in the center console 30 will be described in detail by reference to FIGS. 3 and 4. FIG. 4 is an exploded perspective view of the electric device D.

The electric device D includes high-voltage batteries 32, an ECU 41, and a high-voltage system equipment 35, and these high-voltage batteries 32, ECU 41 and high-voltage system equipment 35 are made into a unit by being supported by a frame member 31. The frame member 31 is made up as a result of an upper frame member 31U, a lower frame member 31D, and a middle frame member 31M which joins the upper frame member 31U and the lower frame member 31D together being surrounded by a front cover member 31F, a left cover member 31L, a right cover member 31R and a rear cover member 31B.

The high-voltage batteries 32, the ECU 41 and the high-voltage equipment 35 are disposed sequentially in this order from the rear of the vehicle. The high-voltage system equipment 35 includes a junction box 33 which is attached to a front surface of the middle frame member 31M and a converter (PCU) 34 which is disposed ahead of the junction box 33 to convert the voltages of the high-voltage batteries 32. The ECU 41 described above is attached to a rear surface of the middle frame member 31M. The converter (PCU) 34 includes a DC-DC converter 42 and an inverter 44, and these DC-DC converter 42 and inverter 44 are disposed transversely side by side in a space defined between the front cover member 31F and the junction box 33.

An intake duct 37 is attached to left side surfaces of the high-voltage batteries 32 to be disposed between the high-voltage batteries 32 and the left cover member 31L, and a discharge duct 38 is attached to right side surfaces of the high-voltage batteries 32 to be disposed between the high-voltage batteries 32 and the right cover member 31R. Cell voltage sensors (CVS) 46 are fixed to a lower surface of the lower frame member 31D and are covered by a CVS cover 45. The electric device D is fixed to the center tunnel 12 as a result of the lower frame member 31D being fastened to the center tunnel 12 with bolts. The cooling fan 36 is attached to the front surface of the front cover member 31F. Air taken in from the intake grille 56 of the center console 30 by the cooling fan 36 passes sequentially through the intake duct 37, the high-voltage batteries 32, and the discharge duct 38 in that order, then passes from the discharge duct 38 through a cooling passageway 39 formed between the DC-DC converter 42 and the inverter 44, and is then sucked out by the cooling fan 36 to be discharged into a discharged air flow path 80F from the cooling fan 36.

<Floor Structure>

Figure 5:
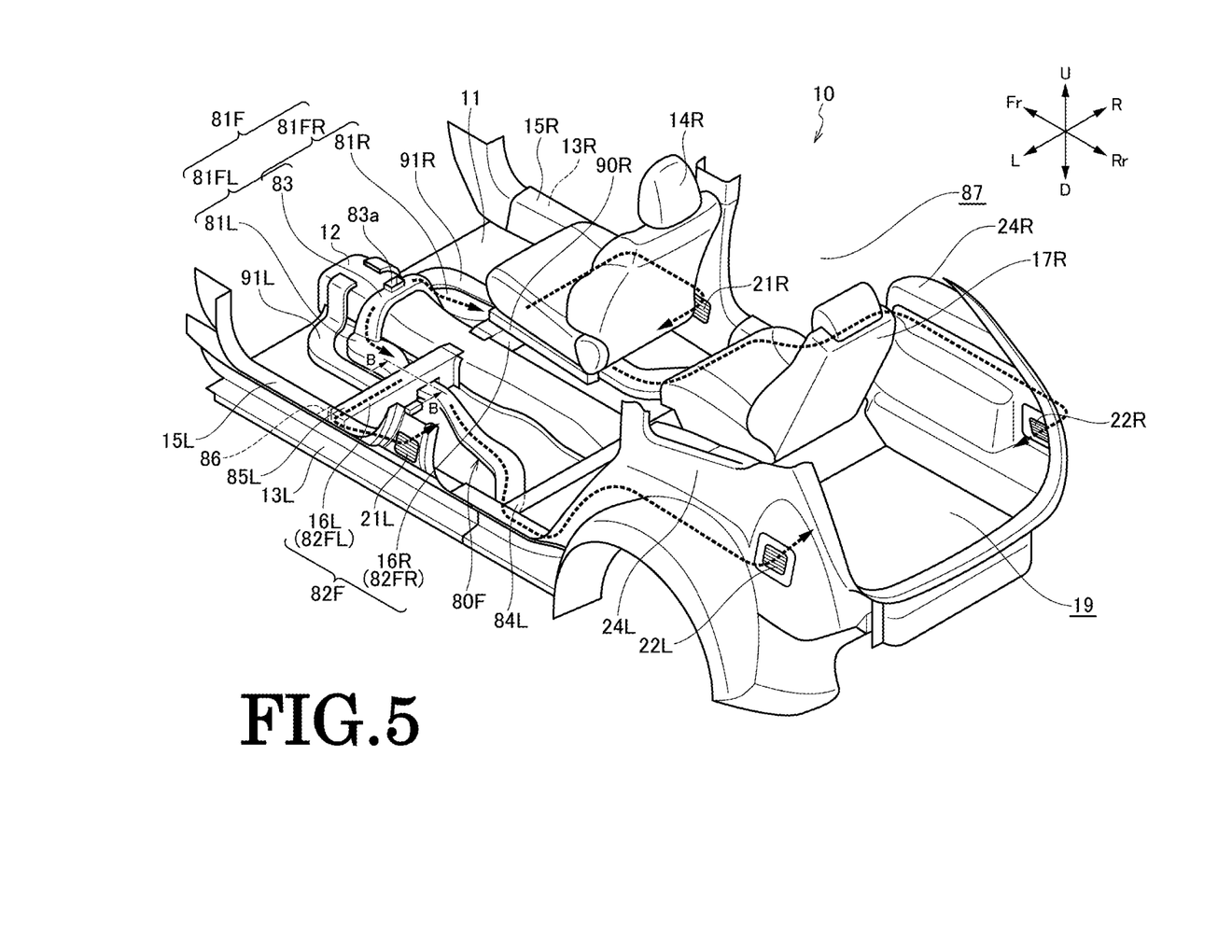
FIG. 5 is a perspective view of a passenger compartment seen from a left rear thereof.
Figure 6:
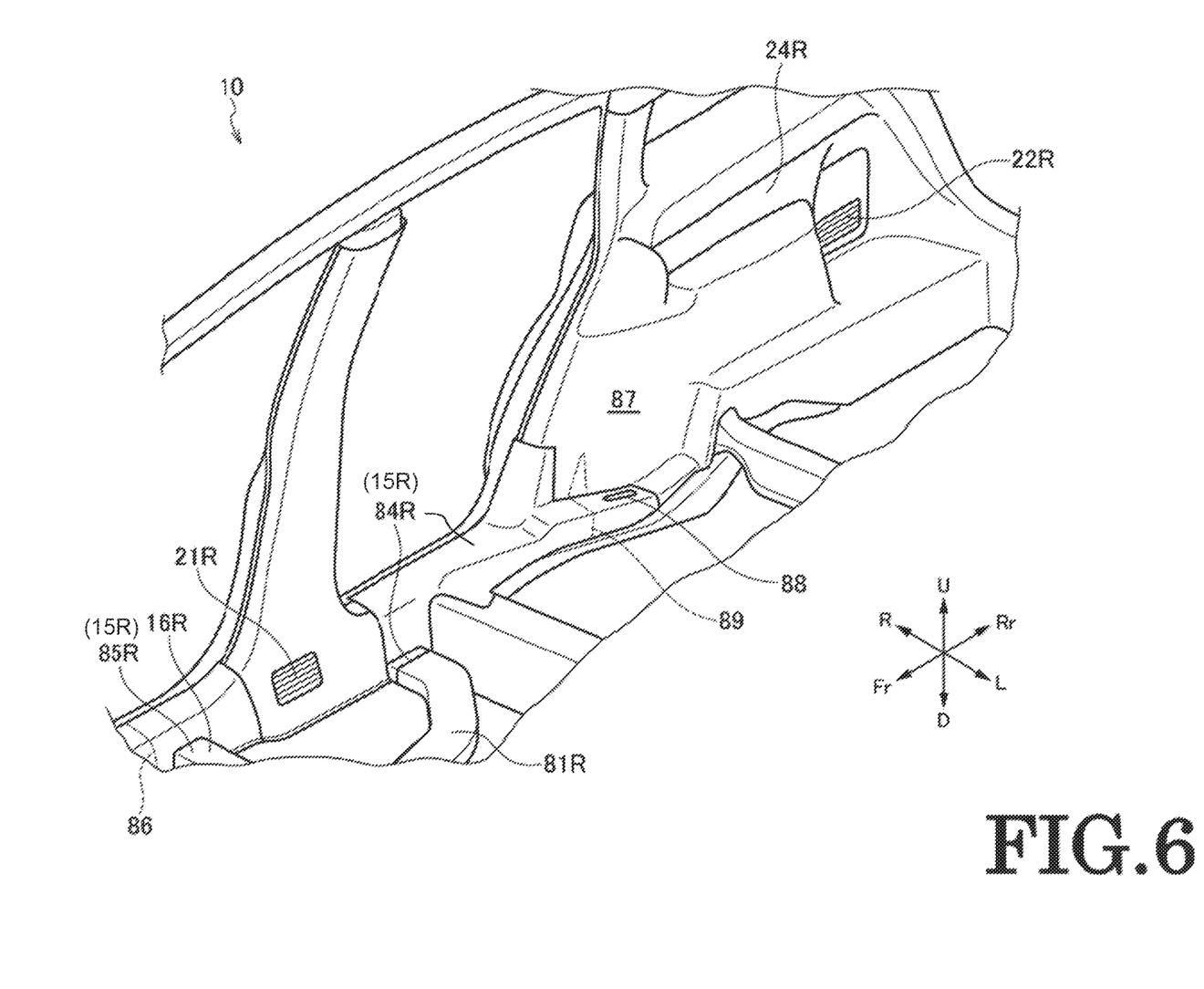
FIG. 6 is a perspective view of the passenger compartment seen from a left front thereof.

Next, the construction of the floor of the vehicle 10 where the discharged air flow path 80F is provided will be described by reference to FIGS. 5 and 6. FIG. 5 is a perspective view of a passenger compartment of the vehicle 10 seen from a left rear thereof, and FIG. 6 is a perspective view of the passenger compartment of the vehicle 10 seen from a left front thereof.

The vehicle 10 has a floor panel 11, the center tunnel 12 having a substantially trapezoidal cross section which is formed between the left front seat 14L and the right front seat 14R so as to extend in a front-rear direction on the floor panel 11, a left side sill 13L and a right side sill 13R which extend in the front-rear direction at left- and right-hand sides of the vehicle 10, a left side trim 15L which covers the left side still 13L, and a right side trim 15R which covers the right side sill 13R. In the passenger compartment 87, a pair of a left rear seat (not shown) and a right rear seat 17R are disposed behind the pair of the left front seat 14L and the right front seat 14R, and further, a luggage compartment 19 is provided behind the left rear seat (not shown) and the right rear seat 17R.

A first left discharge port 21L is provided in the left side trim 15L so as to open towards a side of the left front seat 14L. A left side lining 24L is connected to the rear of the left side trim 15L, and a second left discharge port 22L is provided in the left side lining 24L so as to open to the luggage compartment 19. A first right discharge port 21R is provided in the right side trim 15R so as to open to a side of the right front seat 14R. A right side lining 24R is connected to the rear of the right side trim 15R, and a second right discharge port 22R is provided in the right side lining 24R so as to open to the luggage compartment 19.

A left side wall of the center tunnel 12 and the left side sill 13L are connected together by a left cross member 16L which extends in a left-right direction of the vehicle. A right side wall of the center tunnel 12 and the right side sill 13R are connected together by a right cross member 16R which extends in the left-right direction of the vehicle. A center cross member 16M is provided in the center tunnel 12, too, in a position which coincides with the positions of the left cross member 16L and the right cross member 16R so as to reinforce the center tunnel 12 (refer to FIG. 3). The left front seat 14L is disposed on an upper surface of the left cross member 16L via a seat rail (not shown). The right front seat 14R is disposed on an upper surface of the right cross member 16R via a seat rail 90R. An exhaust pipe 20, which is connected to an internal combustion engine, not shown, at one end thereof, is provided in the center tunnel 12 so as to extend in the front-rear direction (refer to FIG. 3).

<Discharged Air Flow Path>

Figure 7:
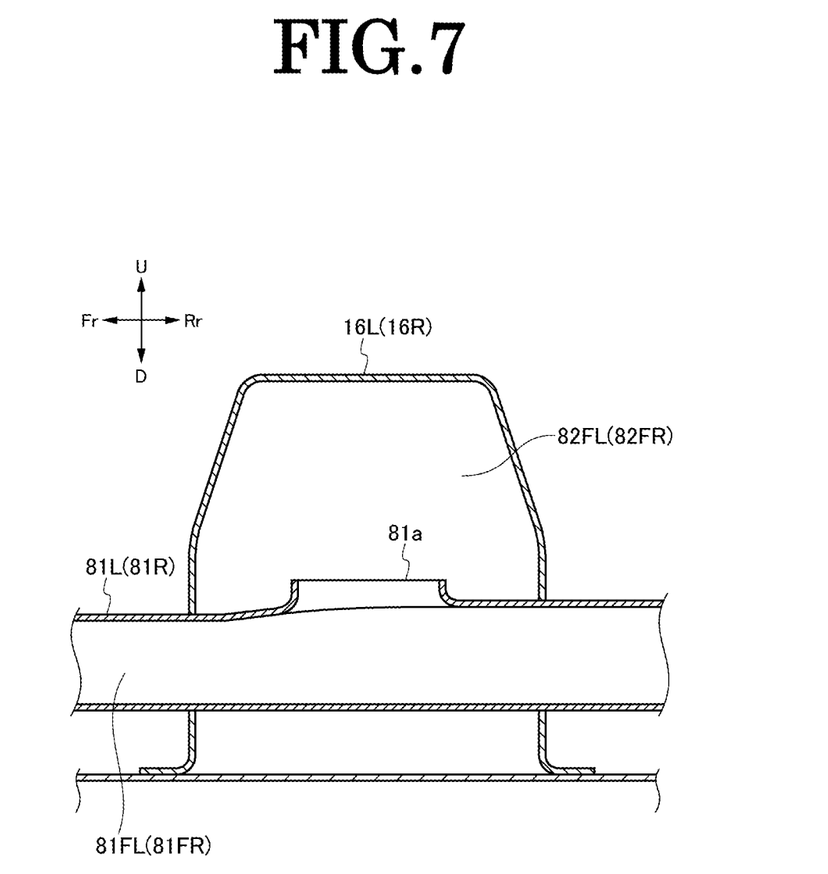
FIG. 7 is a sectional view taken along a line B-B in FIG. 5.

Next, a discharged air flow path 80F will be described by reference to FIGS. 5 to 7. FIG. 7 is a sectional view taken along a line B-B in FIG. 5.

As shown in FIG. 5, the discharged air flow path 80F is made up of a first discharged air flow path 81F and a second discharged air flow path 82F. The first discharged air flow path 81F is made up of a first left discharged air flow path 81FL and a first right discharged air flow path 81FR. The first left discharged air flow path 81FL is made up of a branch duct 83 and a first left discharge duct 81L, and the first right discharged air flow path 81FR is made up of the branch duct 83 and a first right discharge duct 81R.

The branch duct 83 is connected to a discharge port of the cooling fan 36 at one end 83a thereof and is provided so as to straddle the center tunnel 12 to branch toward left and right directions.

The first left discharge duct 81L is connected to the branch duct 83 at one end thereof, passes under the left front seat 14L to extend to the rear on the floor panel 11 and is then connected to a first left connecting portion 84L which is provided in the left side trim 15L near the left rear seat (not shown). The first right discharge duct 81R is connected to the branch duct 83 at one end thereof, passes under the right front seat 14R to extend to the rear on the floor panel 11 and is then connected to a first right connecting portion 84R which is provided in the right side trim 15R near the right rear seat 17R.

The second discharged air flow path 82F is made up of a second left discharged air flow path 82FL and a second right discharged air flow path 82FR. The second left discharged air flow path 82FL is made up of the left cross member 16L, and the second right discharged air flow path 82FR is made up of the right cross member 16R. As shown in FIG. 7, the first left discharge duct 81L having a discharge port 81a formed in an upper surface thereof penetrates the left cross member 16L so that the discharge port 81a is positioned within the left cross member 16L to thereby connect the first left discharge duct 81L and the left cross member 16L together for communication. By adopting this configuration, the second left discharged air flow path 82FL which is made up of the left cross member 16L branches off from the first left discharged air flow path 81FL. In addition, the first right discharge duct 81R having a discharge portion 81a formed in an upper surface thereof penetrates the right cross member 16R so that the discharge port 81a is positioned within the right cross member 16R to thereby connect the first right discharge duct 81R and the right cross member 16R together for communication. By adopting this configuration, the second right discharged air flow path 82FR which is made up of the right cross member 16R branches off from the first right discharged air flow path 81FR.

The left cross member 16L which makes up the second left discharged air flow path 82FL is connected to the left side sill 13L at a second left connecting portion 85L which is provided on the left side trim 15L in a position lying near the left front seat 14L. The right cross member 16R which makes up the second right discharged air flow path 82FR is connected to the right side sill 13R at a second right connecting portion 85R which is provided on the right side trim 15R in a position lying near the right front seat 14R. A gap with a predetermined width is provided in the second left connecting portion 85L and the second right connecting portion 85R, and air inside the left cross member 16L and air inside the right cross member 16R are discharged into an inner space defined by the left side trim 15L and the left side sill 13L, and the right side trim 15R and the right side sill 13R.

A rib 86, which is configured to prevent discharged air from flowing further forwards than the second left connecting portion 85L, is formed inside the left side trim 15L. A rib 86, which is configured to prevent discharged air from flowing further forwards than the second right connecting portion 85R, is formed inside the right side trim 15R. These ribs 86 are provided so as to project from the left side trim 15L and the right side trim 15R, respectively, so as to close the inner space defined by the left side trim 15L and the left side sill 13L, and the right side trim 15R and the right side sill 13R.

As shown in FIG. 6, the opening portions 88 for seat-belt anchorages are formed in the left side trim 15L and the right side trim 15R, and guides 89, which are configured to prevent discharged air from flowing into the opening portions 88, are provided upstream of the opening portions 88 inside the left side trim 15L and the right side trim 15R.

Returning to FIG. 5, a left air-conditioning heater duct 91L and a right air-conditioning heater duct 91R are disposed on sides of the first left discharge duct 81L and the first right discharge duct 81R, respectively, so as to extend along the first left discharge duct 81L and the first right discharge duct 81R, respectively.

Next, the function of the embodiment which is configured in the way described heretofore will be described.

When the cooling fan 36 is activated to cool the high-voltage batteries 32 and the high-voltage system equipment 35 which are accommodated in the center console 30, air inside the passenger compartment 87 is taken in from the intake grille 56 of the cover member 57 as cooling air. This cooling air flows from the intake duct 37 through the high-voltage batteries 32 towards the discharge duct 38 to cool the high-voltage batteries 32. Thereafter, the cooling air passes through the cooling passageway 39 which is defined between the DC-DC converter 42 and the inverter 44 to cool the DC-DC converter 42 and the inverter 44. Then, the cooling air flows into the branch duct 83 from the cooling fan 36 and branches into left and right flows.

The left flow of cooling air is guided into the first left discharge duct 81L and flows into the inner space defined by the left side trim 15L and the left side sill 13L from the first left connecting portion 84L which is provided on the left side trim 15L in the position lying near the left rear seat (not shown). Further, the cooling air flows to the rear in an interior of the left side trim 15L and is returned to the passenger compartment 87 from the second left discharge port 22L and from a gap, not shown, which is defined by the left side trim 15L and a floor mat before the cooling air reaches the second left discharge port 22L.

The right flow of cooling air which branches off rightwards at the branch duct 83 is guided into the first right discharge duct 81R and flows into the inner space defined by the right side trim 15R and the right side sill 13R from the first right connecting portion 84R which is provided on the right side trim 15R in the position lying near the right rear seat 17R. Further, the cooling air flows to the rear in an interior of the right side trim 15R and is returned to the passenger compartment 87 from the second right discharge port 22R and from a gap, not shown, which is defined by the right side trim 15R and a floor mat before the cooling air reaches the second right discharge port 22R.

On the other hand, part of the cooling air which flows to the rear in the first left discharge duct 81L branches off at the discharge port 81a which opens to the interior of the left cross member 16L and flows along the left cross member 16L in the inner space defined by the left side trim 15L and the left side sill 13L from the second left connecting portion 85L which is provided on the left side trim 15L in the position lying near the left front seat 14L. Then, the part of the cooling air flows to the rear in the interior of the left side trim 15L and is returned to the passenger compartment 87 from the first left discharge port 21L and from a gap, not shown, which is defined by the left side trim 15L and a floor mat before the part of the cooling air reaches the first left discharge port 21L. As this occurs, part of the cooling air which attempts to flow forwards from the second left connecting portion 85L is prevented from so flowing by the rib 86 which is formed inside the left side trim 15L, and therefore, the cooling air is returned to the passenger compartment 87 mainly from the portions described above which lie further rearwards than the second left connecting portion 85L.

Part of the cooling air which flows to the rear in the first right discharge duct 81R branches off at the discharge port 81a which opens to the interior of the right cross member 16R and flows along the right cross member 16R in the inner space defined by the right side trim 15R and the right side sill 13R from the second right connecting portion 85R which is provided on the right side trim 15R in the position lying near the right front seat 14R. Then, the part of the cooling air flows to the rear in the interior of the right side trim 15R and is returned to the passenger compartment 87 from the first right discharge port 21R and from a gap, not shown, which is defined by the right side trim 15R and a floor mat before the part of the cooling air reaches the first right discharge port 21R. As this occurs, part of the cooling air which attempts to flow forwards from the second right connecting portion 85R is prevented from so flowing by the rib 86 which is formed inside the right side trim 15R, and therefore, the cooling air is returned to the passenger compartment 87 mainly from the portions described above which lie further rearwards than the second right connecting portion 85R.

Although the opening portions 88 for seat-belt anchorages are formed in the left side trim 15L and the right side trim 15R, since the guides 89 configured to prevent discharged air from flowing into the opening portions 88 are provided inside the left side trim 15L and the right side trim 15R, there is no such situation that discharged air flows strongly out of the opening portions 88, whereby no uncomfortableness is given to the occupant.

In this way, the cooling air used to cool the high-voltage batteries 32 is discharged in a spreading fashion from the first left connecting portion 84L, the first right connecting portion 84R, the second left connecting portion 85L and the second right connecting portion 85R into the left side trim 15L and the right side trim 15R by way of the first discharge duct 81F and the second discharge duct 82F. Further, the cooling air is spread within the left side trim 15L and the right side trim 15R and is discharged in a spreading fashion into the passenger compartment 87 mainly from the first left discharge port 21L, the first right discharge port 21R, the second left discharge port 22L and the second right discharge port 22R. Consequently, the occupants are not given uncomfortableness by the discharged cooling air which is returned to the passenger compartment 87, and the batteries can be cooled by the cooling air with good efficiency.

Thus, as has been described heretofore, according to the vehicle 10 of this embodiment, the discharged air flow path 80F connected to the cooling fan 36 has the first discharged air flow path 81F which is connected to the left side trim 15L and the right side trim 15R by the first left connecting portion 84L and the first right connecting portion 84R, respectively, and the second discharge air flow path 82F which is connected to the left side trim 15L and the right side trim 15R by the second left connecting portion 85L and the second right connecting portion 85R, respectively, which branch off from the first discharged air flow path 81F and which are provided in the different positions from the first discharged air flow path 81F. Therefore, the cooling air used to cool the high-voltage batteries 32 can be discharged in a spreading fashion into the left side trim 15L and the right side trim 15R. Additionally, the cooling air discharged into the left side trim 15L and the right side trim 15R in a spreading fashion can be further discharged into the passenger compartment 87 in a spreading fashion by way of the left side trim 15L and the right side trim 15R, thereby making it possible to ensure a comfortable environment within the passenger compartment by suppressing the uncomfortableness given to the occupants by the flow of discharged cooling air.

The left cross member 16L and the right cross member 16R are connected to the center tunnel 12 on the upper surface of which the center console 30 is disposed, and the second discharged air flow path 82F is made up of the left cross member 16L and the right cross member 16R. Therefore, part of the discharge ducts which make up the discharged air flow path 80F can be made unnecessary, whereby the number of parts involved can be reduced, thereby making is possible to suppress the costs.

Further, the left front seat 14L and the right front seat 14R are disposed on the upper surfaces of the left cross member 16L and the right cross member 16R, respectively, and the first discharged air flow path 81F is connected to the left cross member 16L and the right cross member 16R below the upper surfaces of the left cross member 16L and the right cross member 16R, whereby the second discharged air flow path 82F branches off from the first discharged air flow path 81F. Namely, since the left cross member 16L and the right cross member 16R make up the second discharged air flow path 82F while supporting the left front seat 14L and the right front seat 14R, respectively, the parts can be made commonable, whereby the number of parts can be reduced, thereby making it possible to suppress the costs.

Since the first left discharge port 21L is provided in the left side trim 15L between the first left connecting portion 84L and the second left connecting portion 85L in the front-rear direction, the cooling air used to cool the high-voltage batteries 32 is discharged to the feet of the occupant, whereby the direct contact of the cooling air with the occupant can be prevented. Thus, it is possible to suppress the uncomfortableness given to the occupant by the cooling air, thereby making it possible to ensure the comfortable environment within the passenger compartment. In addition, since the first right discharge port 21R is provided in the right side trim 15R between the first right connecting portion 84R and the second right connecting portion 85R in the front-rear direction, the cooling air used to cool the high-voltage batteries 32 is discharged to the feet of the occupant, whereby the direct contact of the cooling air with the occupant can be prevented. Thus, it is possible to suppress the uncomfortableness given to the occupant by the cooling air, thereby making it possible to ensure the comfortable environment within the passenger compartment.

Further, since the ribs 86 configured to prevent the discharged air from flowing to the front are formed in the left side trim 15L and the right side trim 15R in the positions lying further forwards than the second left connecting portion 85L and the second right connecting portion 85R, the discharged air attempting to flow to the front of the vehicle within the left side trim 15L and the right side trim 15R can be disrupted and can be discharged to behind the left front seat 14L and the right front seat 14R, thereby making it possible to prevent the driver being given uncomfortableness by the discharged air which flows around to the left front seat 14L and the right front seat 14R.

Since the second left discharge port 22L and the second right discharge port 22R are provided in the left side lining 24L and the right side lining 24R, respectively, the cooling air can be discharged from the first left discharge port 21L and the first right discharge port 21R, and the second left discharge port 22L and the second right discharge port 22R in a spreading fashion, whereby it is possible to eliminate uncomfortableness that would be given to the occupants.

Since the opening portions 88 for seat-belt anchorages and the guides 89 which are disposed upstream of the opening portions 88 to prevent the discharged air from flowing into the opening portions 88 are provided in the left side trim 15L and the right side trim 15R, the flows of discharged air inside the left side trim 15L and the right side trim 15R can be rectified by the guides 89 to thereby prevent the discharged air from leaking from the opening portions 88, thereby making it possible to eliminate uncomfortableness that would be given to the occupants.

Since the left air-conditioning heater duct 91L and the right air-conditioning heater duct 91R are provided so as to extend along the first left discharge duct 81L and the first right discharge duct 81R, respectively, the temperature of the discharged air in the first left discharge duct 81L and the first right discharge duct 81R can be raised by air flowing in the left air-conditioning heater duct 91L and the right air-conditioning heater duct 91R, whereby it is possible to eliminate uncomfortableness that would be given to the occupants by reducing the difference in temperature between the discharged air and air in the passenger compartment when the outside air temperature is low or the outside is cold.

Since the first left discharged air flow path 81FL and the first right discharged air flow path 81FR are divided from each other by the branch duct 83 which is connected to the cooling fan 36, the cooling air can be discharged simultaneously into the first left discharged air flow path 81FL and the first right discharged air flow path 81FR in a spreading fashion by the single cooling fan 36, and the number of parts involved can be reduced.

The invention is not limited to the embodiment that has been described above and hence can be modified or improved as required.

In the embodiment, the first discharged air flow path 81F is made up of the first left discharged air flow path 81FL and the first right discharged air flow path 81FR, the second discharged air flow path 82F is made up of the second left discharged air flow path 82FL and the second right discharged air flow path 82FR, and the first discharged air flow path 81FL and the second discharged air flow path 82F are constructed so as to be laterally symmetrical. However, the invention is not limited thereto. The first discharged air flow path 81F may be made up of either of the first left discharged air flow path 81FL and the first right discharged air flow path 81FR, and the second discharged air flow path 82F may be made up of either of the second left discharged air flow path 82FL and the second right discharged air flow path 82FR.

In the embodiment, the second left discharged air flow path 82FL is made up of the left cross member 16L, and the second right discharged air flow path 82FR is made up of the right cross member 16R. However, the invention is not limited thereto. The second left discharged air flow path 82FL and the second right discharged air flow path 82FR may be made up of separate members from the left cross member 16L and the right cross member 16R.

In addition, the center tunnel 12 may be formed only by the floor panel 11 or an integral formed product in which the floor panel 11 is covered by a center tunnel cover.

This patent application is based on Japanese Patent Application (No. 2014-215526) filed on Oct. 22, 2014, the contents of which are incorporated herein by reference.

DESCRIPTION OF REFERENCE NUMERALS 10 vehicle
11 floor panel
12 center tunnel
13L left side sill
13R right side sill
14L left front seat (front seat)
14R right front seat (front seat)
15L left side trim (side trim)
15R right side trim (side trim)
16L left cross member (cross member)
16R right cross member (cross member)
21L first left discharge port (first discharge port)
21R first right discharge port (first discharge port)
22L second left discharge port (second discharge port)
22R second right discharge port (second discharge port)
30 center console
32 high-voltage battery
36 cooling fan
80F discharged air flow path
81F first discharged air flow path
81FL first left discharged air flow path
81FR first right discharged air flow path
81L first left discharge duct (first left discharged air flow path)
81R first right discharge duct (first right discharged air flow path)
82F second discharged air flow path
82FL second left discharged air flow path
82FR second right discharged air flow path 83 branch duct (branch member)
84L first left connecting portion
84R first right connecting portion
85L second left connecting portion
85R second right connecting portion
86 rib
87 passenger compartment
88 opening portion
89 guide
91L left air-conditioning heater duct (air-conditioning heater duct)
91R right air-conditioning heater duct (air-conditioning heater duct)

The invention claimed is:

1. A vehicle comprising: a pair of a left side sill and a right side sill which extend in a front-rear direction; a center console which is disposed on a floor panel and which installs therein a high-voltage battery and a cooling fan; a discharged air flow path which is connected to the cooling fan through the center console and a center tunnel which is formed on the floor panel so as to extend in the front-rear direction; and a left side trim which covers the left side sill and a right side trim which covers the right side sill, wherein the discharged air flow path has: a first discharged air flow path which is connected to the cooling fan and which is connected to a side trim, the side trim being at least one of the left side trim and the right side trim; and a second discharged air flow path which branches off from the first discharged air flow path and which is connected to the side trim, wherein a first connecting portion which connects the first discharged air flow path and the side trim is spaced away from a second connecting portion which connects the second discharged air flow path and the side trim in the front-rear direction, wherein the first discharged air flow path and the second discharged air flow path discharge air into a passenger compartment via the side trim, and wherein a first discharge port is provided in the side trim between the first connecting portion and the second connecting portion in the front-rear direction.

2. The vehicle according to claim 1, wherein
the center console is disposed on a center tunnel which is formed on the floor panel so as to extend in the front-rear direction,
a left cross member which is connected to the left side sill and a right cross member which is connected to the right side sill are connected to the center tunnel, and
the second discharged air flow path is made up of at least one cross member of the left cross member and the right cross member.

3. The vehicle according to claim 2, wherein
one of a pair of left and right front seats is disposed on an upper surface of the cross member, and
the second discharged air flow path branches off from the first discharged air flow path by connecting the first discharged air flow path to the cross member below the upper surface of the cross member.

4. The vehicle according to claim 1, wherein
a rib configured to disrupt a forward flow of discharged air is formed on the side trim in a position lying further forwards than the second connecting portion.

5. The vehicle according to claim 1, wherein
a side lining is connected to a rear of the side trim, and
a second discharge port is provided in the side lining.

6. The vehicle according to claim 5, wherein
an opening portion which opens upward is provided in the side trim, and
a guide configured to disrupt a flow of discharged air to the opening portion is provided in the side trim in a position lying upstream of the opening portion.

7. The vehicle according to claim 1, wherein
an air-conditioning heater duct is provided so as to extend along the first discharged air flow path.

8. The vehicle according to claim 1, wherein
the first discharged air flow path has:
a first left discharged air flow path which is connected to the left side trim; and
a first right discharged air flow path which is connected to the right side trim,
the second discharged air flow path has:
a second left discharged air flow path which branches off from the first left discharged air flow path and which is connected to the left side trim; and
a second right discharged air flow path which branches off from the first right discharged air flow path and which is connected to the right side trim,
the first left discharged air flow path and the second left discharged air flow path discharge air into the passenger compartment via the left side trim, and
the first right discharged air flow path and the second right discharged air flow path discharge air into the passenger compartment via the right side trim.

9. The vehicle according to claim 8, wherein
the first left discharged air flow path and the first right discharged air flow path are divided by a branch member which is connected to the cooling fan through the center console and the center tunnel.

10. A vehicle comprising:
a pair of a left side sill and a right side sill which extend in a front-rear direction;
a center console which is disposed on a floor panel and which installs therein a high-voltage battery and a cooling fan;
a discharged air flow path which is connected to the cooling fan; and
a left side trim which covers the left side sill and a right side trim which covers the right side sill, wherein
the discharged air flow path has:
a first discharged air flow path which is connected to the cooling fan and which is connected to a side trim, the side trim being at least one of the left side trim and the right side trim; and
a second discharged air flow path which branches off from the first discharged air flow path and which is connected to the side trim, wherein
a first connecting portion which connects the first discharged air flow path and the side trim is spaced away from a second connecting portion which connects the second discharged air flow path and the side trim in the front-rear direction,
the first discharged air flow path and the second discharged air flow path discharge air into a passenger compartment via the side trim, and
a first discharge port is provided in the side trim between the first connecting portion and the second connecting portion in the front-rear direction.

* * * * *